United States Patent
Borghese et al.

(10) Patent No.: US 9,767,699 B1
(45) Date of Patent: Sep. 19, 2017

(54) SYSTEM FOR AND METHOD OF DETECTING DRONES

(71) Applicants: John W. Borghese, Cedar Rapids, IA (US); Arlen E. Breiholz, Cedar Rapids, IA (US)

(72) Inventors: John W. Borghese, Cedar Rapids, IA (US); Arlen E. Breiholz, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 211 days.

(21) Appl. No.: 14/712,500

(22) Filed: May 14, 2015

(51) Int. Cl.
*G01C 21/00* (2006.01)
*G08G 5/00* (2006.01)
*H04W 4/02* (2009.01)
*G08G 5/02* (2006.01)

(52) U.S. Cl.
CPC ........... *G08G 5/0013* (2013.01); *G08G 5/025* (2013.01); *H04W 4/021* (2013.01)

(58) Field of Classification Search
CPC .... G08G 5/0043; G05D 1/101; B64C 27/006; H04W 4/021
USPC ................. 340/979, 961, 988, 915
See application file for complete search history.

(56) References Cited

U.S. PATENT DOCUMENTS

| | | | |
|---|---|---|---|
| 2010/0023191 A1* | 1/2010 | Stefani | G08G 5/06 701/21 |
| 2015/0194059 A1* | 7/2015 | Starr | G06F 3/0484 701/3 |
| 2015/0302858 A1* | 10/2015 | Hearing | G10L 19/00 381/58 |

* cited by examiner

*Primary Examiner* — Phung Nguyen
(74) *Attorney, Agent, or Firm* — Donna P. Suchy; Daniel M. Barbieri

(57) ABSTRACT

An apparatus and method can provide a warning of a drone or unmanned aerial vehicle in the vicinity of an airport. The apparatus can include at least one antenna directionally disposed at an along the approach or departure path and a detector configured to provide a warning of a presence of sense an unmanned aerial or drone. The warning can be provided in response to a radio frequency signal received by the at least one of the antenna being in a frequency band associated with a transmission frequency for the unmanned aerial vehicle or drone or in a frequency band associated with interaction from receive circuitry of the unmanned aerial vehicle or drone.

20 Claims, 4 Drawing Sheets

SYSTEM FOR AND METHOD OF DETECTING DRONES

BACKGROUND

The present disclosure relates to sensing or detecting a presence of unmanned aerial vehicles (UAVs) or drones including but not limited to passively or actively detecting a presence and/or location of one or more drones in an airport environment.

Unmanned aerial vehicles or drones (e.g., quad copters, fixed wing aircraft, helicopters, etc.) are being used in increasing numbers for a variety of reasons including entertainment, surveillance, recreation, military, policing, security, firefighting, etc. With the advent of lower cost drones, drones are often controlled by unsophisticated operators. Operating drones near an airport can be problematic for aircraft approach and landing operations as well as aircraft take off and departure operations. This problem is exacerbated by the increased population of unsophisticated operators and owners. In particular, drone traffic in approach and departure corridors can create a risk of a mid-air collision and danger to an aircraft. For example, ingestion of a drone into an engine can cause an engine malfunction.

Thus, there is a need for a system for and method of detecting a presence of drones or unmanned aerial vehicles in the proximity of an airport. Further, there is a need for a system for and method of detecting a presence of drones or unmanned aerial vehicles in approach and departure corridors. There is also a need for a low cost drone detector and locator. There is still a further need for systems for and methods of providing drone locations to air traffic control and/or to aircraft. Yet further, there is a need for a low cost drone presence warning for aircraft and air traffic control.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

In one aspect, embodiments of the inventive concepts disclosed herein are directed to an apparatus and method that can provide a warning of a drone or unmanned aerial vehicle in the vicinity of an airport. The apparatus can include at least one antenna directionally disposed along the approach or departure path and a detector configured to provide a warning of a presence of an unmanned aerial vehicle or drone. The warning can be provided in response to a radio frequency signal received by the at least one antenna being in a frequency band associated with a transmission frequency for the unmanned aerial vehicle or drone or in a frequency band associated with interaction from receive circuitry of the unmanned aerial vehicle or drone.

In a further aspect, embodiments of the inventive concepts disclosed herein are directed to an apparatus for detecting at least one unmanned aerial vehicle or drone in an area associated with a runway. The apparatus including at least one antenna and a detector in communication with the antenna configured to receive a radio frequency signal from the antenna associated with an unmanned aerial vehicle or drone. The radio frequency signal being in a frequency band associated with a transmission frequency for the unmanned aerial vehicle or drone or in a frequency band associated with interaction from receive circuitry of the unmanned aerial vehicle or drone.

In a further aspect, embodiments of the inventive concepts disclosed herein are directed to a method of sensing an unmanned aerial vehicle or drone in an approach or departure path of an aircraft. The method includes receiving radio frequency signal from a plurality of antennas directionally disposed along the approach or departure path, and processing the radio frequency signal to sense the unmanned aerial vehicle or drone. The radio frequency signal is in a frequency band associated with a transmission frequency for the unmanned aerial vehicle or drone or in a frequency band associated with interaction from receive circuitry of the unmanned aerial vehicle or drone.

In a further aspect, embodiments of the inventive concepts disclosed herein are directed to a runway system. The runway system includes antennas directionally disposed along the approach or departure path and a detector configured to provide a warning of a presence of an unmanned aerial vehicle or drone in response to a radio frequency signal received by at least one of the antennas being in a frequency band associated with a transmission frequency for the unmanned aerial vehicle or drone or in a frequency band associated with interaction from receive circuitry of the unmanned aerial vehicle or drone.

In another aspect, embodiments of the inventive concepts disclosed herein are directed to a drone warning system. The drone warning system includes antennas and a detector configured provide a location of a land-based transmitter associated with an unmanned aerial vehicle or drone in response to a radio frequency signal received by at least one of the antennas.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Figure 1:
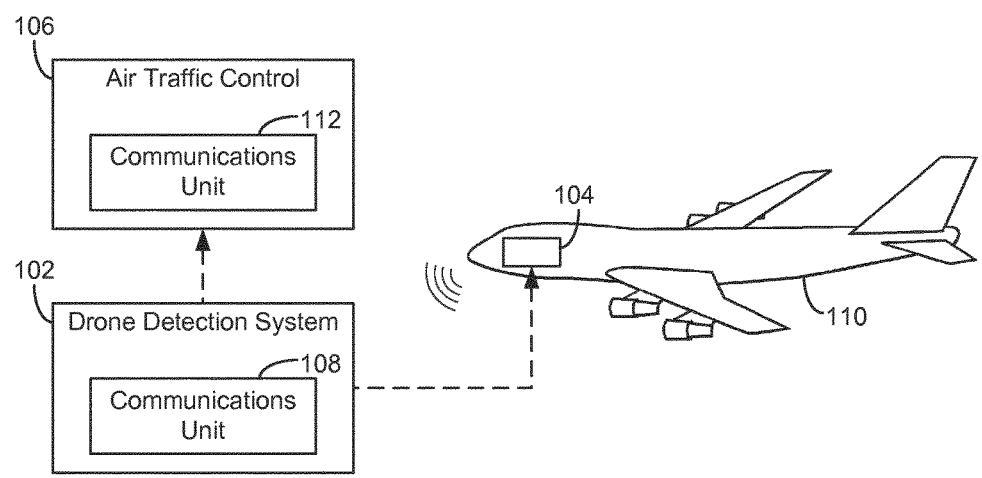
FIG. 1 is a schematic general block diagram of a system for detecting and/or locating drones according to some embodiments.

Before describing in detail the inventive concepts disclosed herein, it should be observed that the inventive concepts disclosed herein include, but are not limited to, a novel structural combination of components, and not in the particular detailed configurations thereof. Accordingly, the structure, methods, functions, control and arrangement of components, software, modules, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

According to various exemplary embodiments, a radio frequency detector is used to detect drones. The detector is advantageously less expensive than radar systems and avoids the difficulty of actively sensing drones using radar. Certain drones can be difficult to detect using radar due to their small size and lack of reflective materials. In some embodiments, the detector provides a warning when a drone is detected in the vicinity of an airport and provides data for displaying a location of the drone in some embodiments. The term drone as used herein includes any type of unmanned or robotic aerial vehicle including hobby planes, toys, quad copters, fixed wing aircraft, helicopters, and other sophisticated and unsophisticated drones.

In some embodiments, the detector is a passive detector that listens for radio frequency signals associated with drones (e.g., bi-directional control signals provided between the ground controller and the drone, video signals provided by the drone, etc.) and analyzes those signals to detect the presence of a drone. In some embodiments, the radio frequency signals are analyzed for characteristics, such as, modulation technique, frequency bands, channels within the frequency bands, video signals, other radio frequency signatures, combinations thereof, etc., and a drone is detected when there is a match of such characteristics with characteristics associated with drones. In some embodiments, digital data in the radio frequency signal is analyzed for detecting whether the source of the radio frequency signal is associated with a drone.

In some embodiments, the detector is an active detector that provides radio frequency signals in one or more frequency bands associated with drones and listens for a radio frequency signal corresponding to an interaction (e.g., resulting in a ringing signal or resonance signal) with the receive circuitry (front or back receive circuitry) in the drone. The interaction can be at a harmonic of the radio frequency signal transmitted from the active detector in some embodiments. Analysis of the interaction is used to detect the presence of a drone in some embodiments.

In some embodiments, systems and methods use directional antennas having coverage corresponding to approach and departure paths at an airport. In some embodiments, the antennas can be disposed to receive and/or transmit signals along a 2-4 degree title angle from a landing zone or end of the runway. In some embodiments, the antennas are arranged at each end of the runway and have a narrow spatial coverage area (e.g., narrow horizontal and vertical coverage area) to reduce detection of signals that do not merit a warning. The antennas can be any of a variety of shapes in some embodiments. In some embodiments, the antennas are corner antennas or horn antennas including but not limited to pyramidal horn antennas, sectoral horn antennas, E-plane horn antennas, H-plane horn antennas, conical horn antennas, exponential horn antennas, corrugated horn antennas, ridged horn antennas, septum horn antennas, and aperture-limited horn antennas.

Referring to FIG. 1, a drone detection system 102 is provided in an airport vicinity. A communication unit 104 on aircraft 110 communicates with drone detection system 102 via communication unit 108 in some embodiments. A communication unit 112 of air traffic control center 116 communicates with drone detection system 102 via communication unit 108 in some embodiments. A communication unit 112 of air traffic control center 116 communicates with drone detection system 102 via communication unit 108 in some embodiments.

Drone detection system 102 is configured to passively and/or actively detect and/or locate drones that may provide threat to aircraft. In some embodiments, drone detection system 102 directly or via air traffic control center 116 provides a warning to aircraft, such as, aircraft 110. In some embodiments, drone detection system 102 directly or via air traffic control center 116 provides location information associated with one or more detected drones to aircraft, such as, aircraft 110. In some embodiments, drone detection system 102 provides location information associated with one or more detected drones to air traffic control center 106.

Drone detection system 102 is an electronic system that receives radio frequency signals and analyzes those signals to determine whether a drone is present in the airport vicinity. The radio frequency signals are also analyzed to determine location of each drone in some embodiments. In some embodiments, drone detection system 102 is configured to receive radio frequency signals in an unlicensed frequency band in a limited aerial space in the airport vicinity. The presence of such radio frequency signals indicates presence of a drone in some embodiments.

Communication units 104, 108, and 112 are radios for aircraft and airport communications in some embodiments. Communication units 112 and 108 can be connected via a wired medium in some embodiments. In some embodiments, information from drone detection system 102 is communicated via communication unit 108 to communication unit 112 and provided from air traffic control center 106 to aircraft 110. The information provided by drone detection system 102 can be provided on flight displays (e.g., a traffic collision avoidance display).

Figure 2:
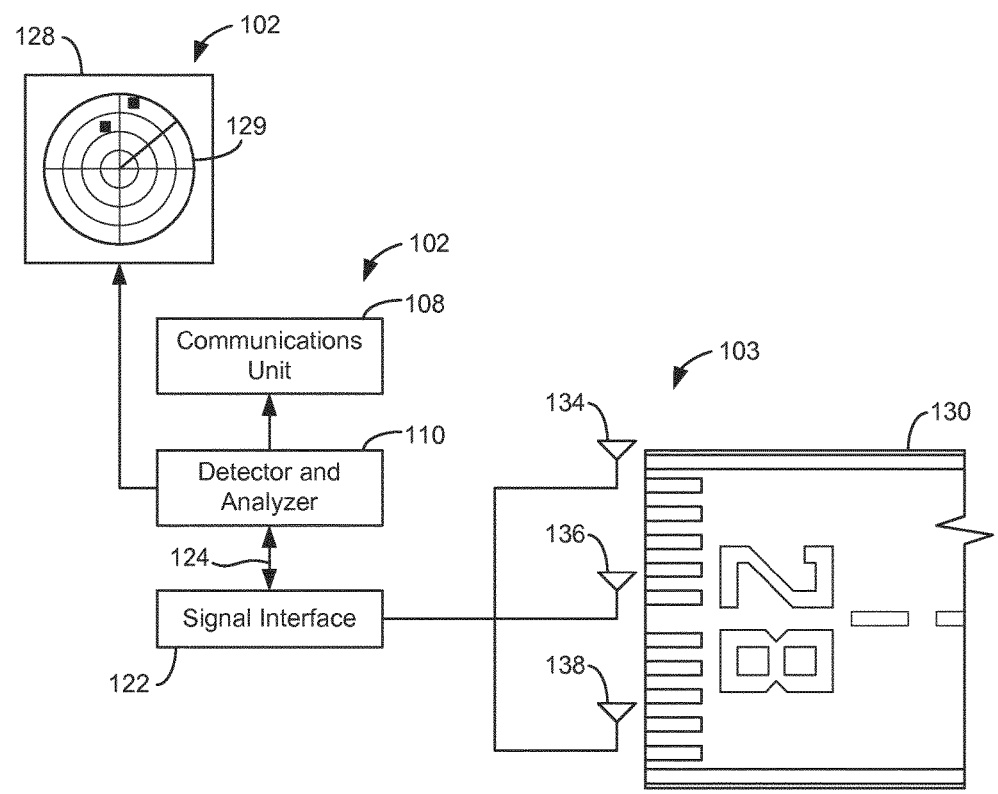
FIG. 2 is a more detailed block diagram of the system for detecting and/or locating drones illustrated in FIG. 1 according to some embodiments.

Referring to FIG. 2, drone detection system 102 is disposed in an airport vicinity 103 including a runway 130 in some embodiments. Drone detection system 102 includes communication unit 108, detector and analyzer 120, signal interface circuit 122, and a set of antennas 134, 136, and 138 in some embodiments. Drone detection system 102 includes a display 128 in some embodiments.

In some embodiments, antennas 134, 136, and 138 are configured to have a restricted or limited listening and/or transmission space. In some embodiments, antennas 134, 136, and 138 are non-omnidirectional or directional antennas having coverage corresponding to approach and departure paths or slopes for aircraft operating in the environment of runway 130. Antennas 134, 136, and 138 directed at an upward angle along the approach or departure paths minimize interference and reception of signals from terrestrial equipment operating in the same or similar frequency bands as drones. In some embodiments, noise from the ground is reduced using directional antennas directed at an upward angle.

In some embodiments, antennas 134, 136, and 138 are disposed to receive and/or transmit signals along a 2-4 degree tilt angle from a landing zone or end of runway 130.

Other angles can be utilized and can be set according to the glide slope angle for the particular approach. For example, some airports use higher glide slope angles due to obstacles. In some embodiments, antennas 134, 136, and 138 are arranged at each end of runway 130 and have a narrow spatial coverage area extending from each of runway antennas 134, 136, and 138. Antennas 134, 136, and 138 are configured to each cover a respective slice from left to right of the approach or departure path in some embodiments.

Figure 6:
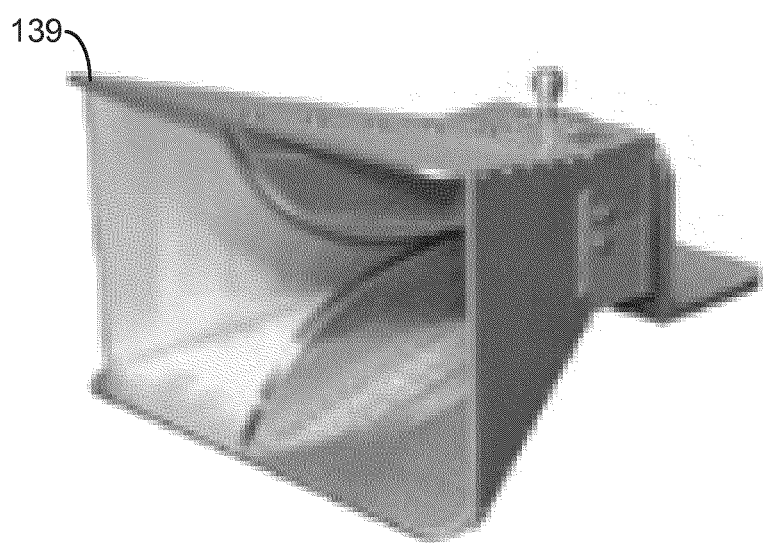
FIG. 6 is a perspective view schematic drawing of a horn antenna for the system illustrated in FIG. 1 according to some embodiments.

Antennas 134, 136, and 138 have any of a variety of shapes (e.g., parabolic, spherical, prismatic, pyramidal, etc.). In some embodiments, antennas 134, 136, and 138 are corner antennas or horn antennas including but not limited to pyramidal horn antennas, sectoral horn antennas, E-plane horn antennas, H-plane horn antennas, conical horn antennas, exponential horn antennas, corrugated horn antennas, ridged horn antennas, septum horn antennas, and aperture-limited horn antennas. In some embodiments, antennas 134, 136, and 138 are integrated with runway lighting systems. The number of and locations of antennas 134, 136, and 138 is not shown in a limiting fashion. FIG. 6 shows an exemplary horn antenna 139 which can be used as one or more of antennas 134, 136, and 138.

In some embodiments, detector and analyzer 120 can steer antennas 134, 136, and/or 138 to a particular target. Antennas 134, 136, and 138 include mechanical gimbals or electronic arrays (e.g., phased array antennas) for steering the antennas toward a target or scanning a spatial volume in some embodiments. In some embodiments, antennas 134, 136, and 138 are steered toward targets to provide a transmission signal that interacts with receiver circuitry in the drone.

Detector and analyzer 120 includes circuitry, processing devices and or software configured to passively and/or actively detect and/or locate drones near runway 130. In some embodiments, drone detection system 102 directly or via air traffic control center 116 provides a warning to aircraft, such as, aircraft 110. In some embodiments, detector and analyzer 120 receives radio frequency signals from antennas 134, 136, and 138 and analyzes those signals to determine a presence of drone in some embodiments. Presence of a drone is determined by matching the radio signal with characteristics associated with signal emitted by a drone such as control signals, video signals or resonance signals. In some embodiments, if the radio frequency signal is in an unlicensed band and in the spatial area associated with arrival or departure, the radio frequency signal is an indication of presence of a drone and a warning is provided. In some embodiments, the power level of the signal (e.g., the power level being associated with power levels used for drone control or drone transmissions) is also a factor in determining a presence of the drone. Generally, radio frequency transmissions from aircraft are in a licensed band and transmissions within such a licensed band for transmission from aircraft are not likely from a drone. In some embodiments, signals in military bands for drones or other bands associated with drone operation is indicative of drone presence.

The radio frequency signals received by antennas 134, 136, and 138 are signals emitted by the drones (flight control signals, or video signals, etc.) or are signals caused by resonance or ringing associated with signals transmitted toward the drones from antennas 134, 136, and 138. The signals can be analyzed to determine modulation technique, frequency bands, channels within the frequency bands, video signals, other radio frequency signatures, combinations thereof, etc. In some embodiments, signals in the unlicensed bands are analyzed as potential drone sources. According to one example, detection of a target using a modulation technique, power level, band, or channel associated with drones is an indication of presence of the drone in some embodiments. For example, a target emitting a drone video signal on one channel associated with drone video signals and drone control signals on another channel associated with drone control is an indication of the presence of a drone. Further, the location of the target is an indication of a drone detection in some embodiments. A target that is located in the altitude bands associated with drones is an indication of a drone detection in some embodiments. Combinations of characteristics can be used to increase confidence in a drone detection.

In some embodiments, targets can be analyzed with respect to known sources that are not drone sources. For example, if the radio frequency signal is associated with licensed communication for aircraft 110, that signal is eliminated from being identified as from a drone. Further, signals identified as aircraft sourced 802.11 signals, aircraft communications addressing and reporting system (ACARS) signals, satellite communication signals, radar signals, etc. are eliminated from being identified as drone signals. Characteristics, such as frequency band, modulation technique, and frequency band, and data contained in the signal can be used to determine that the radio frequency signal is from a source that is not a drone in some embodiments.

The radio frequency signals are analyzed to determine location of each drone in some embodiments. The relative location of the drone is determined in some embodiments. Relative location can be determined by phase comparison, time distance of arrival techniques or beam pattern response techniques in some embodiments. Relative location can be converted to absolute location using the location of antennas 134, 136, and 138. Various locating techniques can be used to determine drone location in response to the radio frequency signal.

Signal interface circuit 122 is a signal receiver or a signal receiver/transmitter in some embodiments. Signal interface circuit 122 is coupled between antennas 134, 136, and 138 and detector and analyzer 120. Signal interface circuit 122 includes amplifiers, interface circuits, conversion circuits, transmit/receive switches, filters, and other circuitry for providing radio RF signals, intermediate frequency signals, baseband signals, or data between antennas 134, 136, and 138 and detector and analyzer 120. In some embodiments, signal interface circuit 122 includes a frequency down conversion circuit, a frequency up conversion circuit, and a filter circuit. Signal interface circuit 122 is controlled by detector and analyzer 120 to provide selected channels or bands of radio frequency signals to detector and analyzer 120 in some embodiments. Signal interface circuit 122 provides selective filtering (e.g., band pass filtering) for selected channels or frequency bands of the radio frequency signals under the control of detector and analyzer 120 in some embodiments. The radio frequency signals, intermediate frequency signals, baseband signals or data related to such signals is provided across a signal bus 124 to detector and analyzer 120 in some embodiments. Signal interference circuit 122 includes modulators and demodulators in some embodiments.

Display 128 is any image source, such as a liquid crystal display. Display 128 is part of system 102, aircraft 110 or air traffic control center 116 in some embodiments. Warnings and/or locations of drones are provided to communications unit 108 from detector and analyzer 120 for receipt by aircraft 110 and/or air traffic control center 116 (FIG. 1) in some embodiments. Drone traffic is displayed on display 128 in a radar display format 129, air traffic control format, or traffic collision avoidance (TCAS) system format in some embodiments. Images for display 128 include weather radar images, TCAS images, enhanced vision system images, synthetic vision system images, or other images modified to show drone traffic detected by detector and analyzer 120 in some embodiments. In some embodiments, the warning includes runway identification information indicating the end and identity of runway 130 associated with the drone detection.

Figure 3:
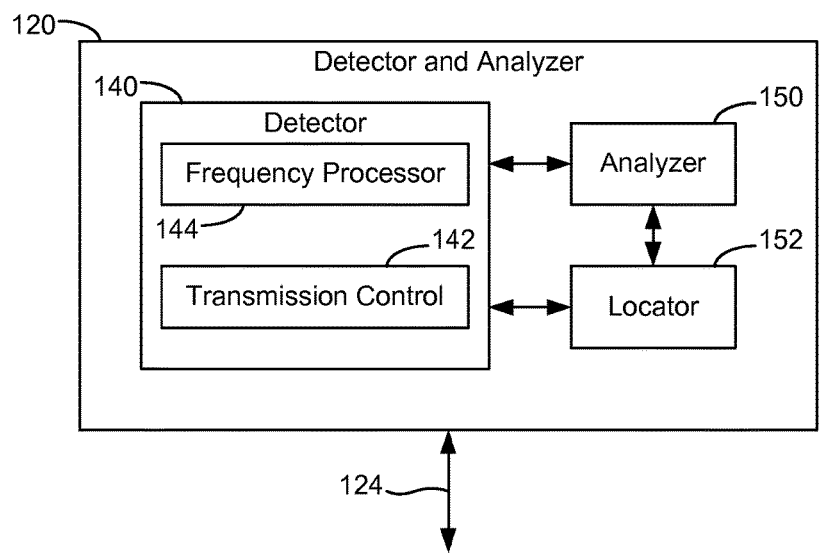
FIG. 3 is more detailed block diagram of a detector and analyzer for the system for detecting and/or locating drones illustrated in FIG. 1 according to some embodiments.

Referring to FIG. 3, detector and analyzer 120 includes a detector 140, an analyzer 150, and a locater 152. Detector 140, analyzer 150, and locater 152 are software modules operating on a processor in some embodiments. In some embodiments, detector 140, analyzer 150, and locater 152 are hardware components (e.g., ASICS) or combination hardware/software components.

Detector 140 receives signals or data on signal bus 124 from signal interface circuit 122 and identifies signals as potential drone detections. Detector 140 processes radio frequency signals according to frequency ranges or channels and provides the radio frequency signals to analyzer 150 in some embodiments. Detector 140 includes a transmission control circuit 142 and a frequency processor 144 in some embodiments.

Analyzer 150 receives radio frequency signals associated with potential and actual targets or data associated therewith and analyzes the signals to identify the radio frequency as coming from a drone in some embodiments. Analyzer 150 can utilize various techniques for identifying signals from drone targets as discussed above in some embodiments. Analyzer 150 can analyze the signal for a match to known characteristics of drone signals and known disqualifying characteristics for drones in some embodiments. Analyzer 150 can provide the warning to communications unit 108 or display 128 in some embodiments. In some embodiments, a strong indication of a presence of a drone is the receipt of both a 2.4 and 5.2 GHZ signal from same location.

Locater 152 employs locating techniques to determine the location of a signal identified as a drone signal in some embodiments. The location can be provided to analyzer 150 in some embodiments. Analyzer 150 can use the location to determine if the signal is from drone in some embodiments. For example, altitude at ground or altitude higher than drone altitudes may indicate that the signal is not from a drone even though other characteristics are drone-like in some embodiments.

In some embodiments, locater 152 tracks movement of the target. The movement is tracked to determine if the movement matches drone type movement for qualifying the detection as drone detection. For example, vertical speed or air speed can be determined and compared to maximum speeds for drones. In some embodiments, relatively slow speeds (e.g., hovering) are indicative that the target is a drone. Antennas 134, 136, and 138 can be steered to track the target in some embodiments.

Frequency processor 144 of detector 140 provides control signals for signal interface circuit 122. Frequency processor 144 can select known drone communication channels for listening and can lock onto a signal when one is detected in some embodiments. Transmission control circuit 142 can be used to select a frequency for a transmission signal for interacting with receive circuitry on the drone in some embodiments. The transmission signal can be provided across a set of frequencies (e.g., in an unlicensed band). Each transmission can be followed by a listening period for resonance or ringing from the receive circuitry in some embodiments. Frequency processor 144 can select listening frequencies (e.g., via a selectable band pass filter in signal interface circuit 122) in some embodiments.

In some embodiments, detector 140 determines existence of a radio frequency signal in a drone frequency range and provides a transmission signal to the source of the radio frequency signal. Analyzer 150 and/or locater 152 are used to locate the source in some embodiments. The transmission signal can be provided toward the source to confirm presence of drone-type receivers at the location in some embodiments. The combination of the initial signal with resonance or ringing from drone-type receivers is a strong indicator of confirmed drone detection in some embodiments.

Table I below discloses exemplary channels used by some drones. Detection of radio frequency signals in these channels can indicate a presence of a drone in some embodiments.

| Frequency | 27 MHz | 49 MHz | 50 MHz | 53 MHz | 72 MHz | 75 MHz | 2.4 GHz |
|---|---|---|---|---|---|---|---|
| Ch. 1 | 26.995 | 49,830 | 50,800 | 53,100 | 72,010 | 75,410 | 2,401,000 |
| Ch. 2 | 27.045 | 49,845 | 50,820 | 53,200 | 72,020 | 75,430 | 2,402,000 |
| Ch. 3 | 27.095 | 49,860 | 50,840 | 53,300 | 72,030 | 75,470 | 2,403,000 |
| Ch. 4 | 27.145 | 49,875 | 50,860 | 53,400 | 72,040 | 75,490 | 2,404,000 |
| Ch. 5 | 27.195 | 49,890 | 50,880 | 53,500 | 72,050 | 75,510 | 2,405,000 |
| Ch. 6 | 27.255 | | 50,900 | 53,600 | 72,060 | 75,530 | 2,406,000 |
| Ch. 7 | | | 50,920 | 53,700 | 72,070 | 75,550 | 2,407,000 |
| Ch. 8 | | | 50,940 | 53,800 | 72,080 | 75,570 | 2,408,000 |
| Ch. 9 | | | 50,960 | | 72,090 | 75,590 | 2,409,000 |
| Ch. 10 | | | 50,980 | | 72,100 | 75,610 | 2,410,000 |
| ... | | | | | ... | | |
| Ch. 60 | | | | | 72,990 | | |
| ... | | | | | | | |
| Ch. 80 | | | | | | | |
| ... | | | | | | | 2,480,000 |
| Ch. 90 | | | | | | 75,990 | |

Table 1—Exemplary Drone Channels. The channels listed above are not exhaustive; other channels for drone transmissions are possible, including channels associated with the 5.3 GHz band. Table 1 is not provided in a limiting fashion.

Figure 4:
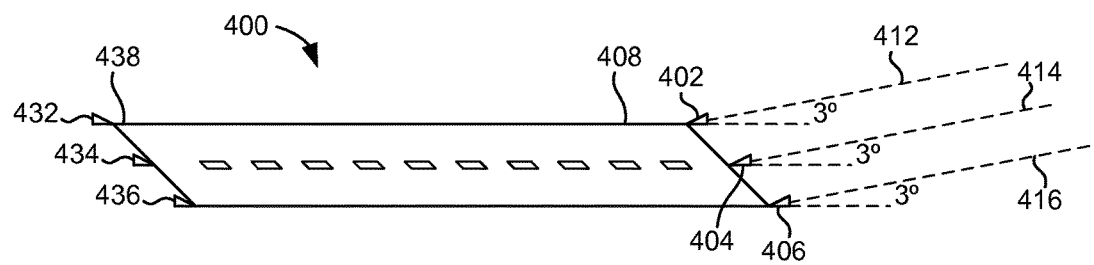
FIG. 4 is a perspective view schematic drawing of a runway with antennas for the system for detecting and/or locating drones illustrated in FIG. 1 according to some embodiments.

Referring to FIG. 4, a runway 400 includes a set of antennas 402, 404, and 406 at an end or landing zone 408 and a set of antennas 432, 434, and 436 at an end or landing zone 438. Antennas 402, 404, and 406 are directed at an angle of 2-4 degrees above horizontal (e.g., 3 degrees) along respective approach paths 412, 414, and 416 in some embodiments. Antennas 402, 404, and 406 are configured to be directed at an elevation angle along a departure path in some embodiments. In some embodiments, antennas 402, 404, and 406 are configured to be directed along a 2.5 to 3.5 degree glide slope.

Figure 5:
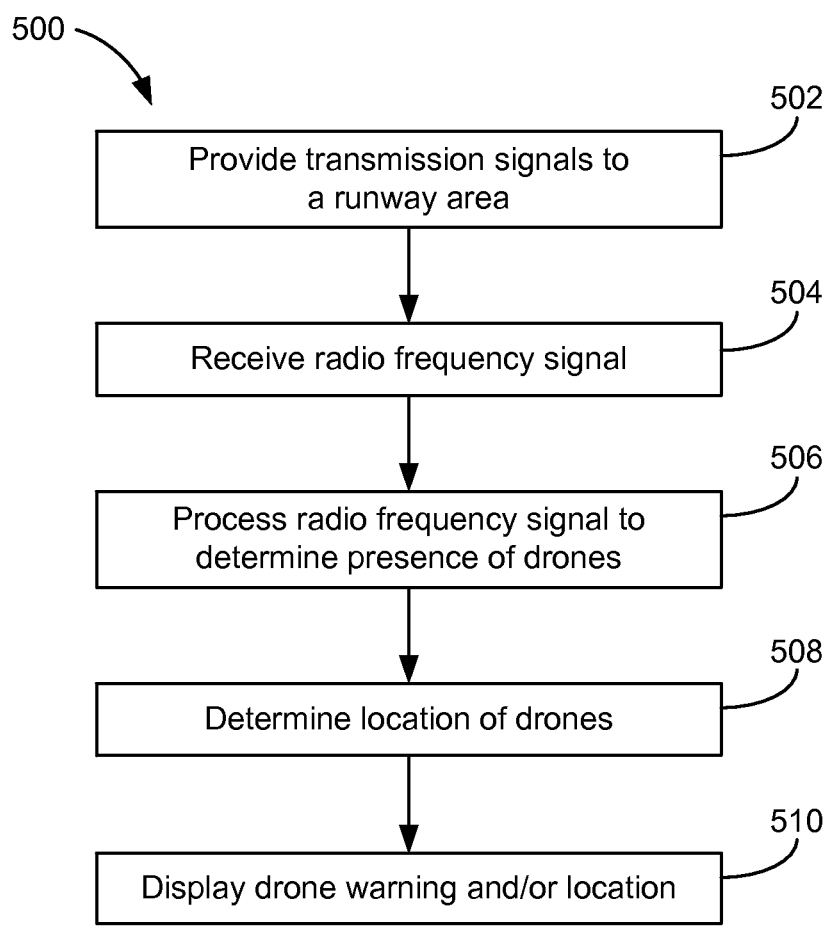
FIG. 5 is a flow diagram showing an exemplary process used by the system for detecting and/or locating drones illustrated in FIG. 1 according to some embodiments.

With reference to FIG. 5, a flow 500 can be performed by drone detection system 102 in some embodiments. At an operation 502, drone detection system 102 provides transmission signals to an approach or departure path of a runway in some embodiments. In some embodiments, the transmission signals are only provided during or just before anticipated approach or departure of aircraft. The transmission signals are provided via antennas, such as antennas 134, 136, and 138 (FIG. 2).

At an operation 504, radio frequency signals are received by drone detection system 102 in some embodiments. The radio frequency signals are received on antennas, such as antennas 134, 136, and 138. The radio frequency signals can be signals transmitted from drones or can be a result of resonance or ringing from receiver or transmitter circuitry in the drone.

At an operation 506, the received radio frequency signals are processed by drone detection system 102 to detect presence of one or more drones in some embodiments. At an operation 508, the received radio frequency signals are processed by drone detection system 102 to detect the location of one or more drones in some embodiments. At an operation 510, a warning is provided via communication unit 508 in some embodiments. In some embodiments, the warning can include data for forming an image. The image associated with the data is displayed on display 128 (FIG. 2) and provides an indication of the location of the drone in the environment. After operation 510, flow 500 returns to operation 502 or 504 in some embodiments. Operations 502 and 508 are optional in some embodiments.

In some embodiments, drone detection system 102 can be modified to detect location of ground based transmitters that control or receive data form the drones. Detect location of such transmitters can enable authorities to find the drone operator. Drone detection system 102 can be provided with a set of omnidirectional antennas and use receptions on those antennas to locate the ground transmitter. The ground transmitter can be located by first identifying a drone in the area via the techniques described with reference to FIGS. 1-5 and determining a presence of radio frequency control signals for the drone via the omnidirectional antennas. The transmitter can be located by triangulation, phase comparison, time distance of arrival techniques or beam pattern response techniques in some embodiments.

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

As noted above, embodiments within the scope of the inventive concepts disclosed herein include program products comprising non-transitory machine-readable media for carrying or having machine-executable instructions or data structures stored thereon. Such machine-readable media may be any available media that may be accessed by a computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a computer or other machine with a processor. Thus, any such a connection is properly termed a machine-readable medium. Combinations of the above are also included within the scope of machine-readable media. Machine-executable instructions comprise, for example, instructions and data which cause processor to perform a certain function or group of functions.

Embodiments in the inventive concepts disclosed herein have been described in the general context of method steps which may be implemented in one embodiment by a program product including machine-executable instructions, such as program code, for example in the form of program components executed by machines in networked environments. Generally, program components include routines, programs, objects, components, data structures, etc. that perform particular tasks or implement particular abstract data types. Machine-executable instructions, associated data structures, and program components represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program components may be located in both local and remote memory storage devices.

The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program components and other data for the computer. User interfaces, as described herein, may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. An apparatus for detecting at least one unmanned aerial vehicle or drone in an area associated with a runway, the apparatus comprising:
   at least one antenna; and
   a detector in communication with the antenna configured to receive a radio frequency signal from the antenna associated with an unmanned aerial vehicle or drone, the radio frequency signal being in a frequency band associated with a transmission frequency for the unmanned aerial vehicle or drone or in a frequency band associated with interaction from receive circuitry of the unmanned aerial vehicle or drone.

2. The apparatus of claim 1, further comprising an analyzer in communication with the detector, the analyzer being configured to determine a presence of the unmanned aerial vehicle or drone.

3. The apparatus of claim 2, wherein the analyzer determines a location of the unmanned aerial vehicle or drone system.

4. The apparatus of claim 3, wherein the analyzer determines the location of the unmanned aerial vehicle or drone using phase comparison between radio frequency signals received on different antennas, time or distance of arrival, or beam pattern response techniques.

5. The apparatus of claim 2, further comprising a communication unit for providing the location to air traffic control or an aircraft.

6. The apparatus of claim 3, further comprising a display for displaying the location.

7. The apparatus of claim 2, wherein the frequency band is in an unlicensed band.

8. The apparatus of claim 1,
   wherein the at least one antenna comprises, a plurality of antennas each disposed at a different location on or near the runway, the antennas being directional antennas directed toward approach and/or departure paths.

9. The apparatus of claim 1, wherein the detector is configured to provide a transmission signal having characteristics such that the transmission signal interacts with the receive circuitry of the unmanned aerial vehicle or drone, wherein the detector is configured to detect a radio frequency signal associated with the interaction from the receive circuitry of the unmanned aerial vehicle or drone.

10. A method of sensing an unmanned aerial vehicle or drone in an approach or departure path of an aircraft, the method comprising:
    receiving radio frequency signal from a plurality of antennas directionally disposed along the approach or departure path; and
    processing the radio frequency signal to sense the unmanned aerial vehicle or drone, the radio frequency signal being in a frequency band associated with a transmission frequency for the unmanned aerial vehicle or drone or in a frequency band associated with interaction from receive circuitry of the unmanned aerial vehicle or drone.

11. The method of claim 10, further comprising:
    wherein the antennas are directed along a path from a runway at an elevation angle corresponding to a glide slope defined for the runway.

12. The method of claim 10, wherein the frequency band is between 27-79 megahertz or 700-900 megahertz.

13. The method of claim 12, wherein the antennas are disposed at ends of a runway.

14. The method of claim 12, further comprising:
    band pass filtering the radio frequency signals using a frequency band of 700-900 megahertz, 2.41-2.48 Gigahertz, and or the 5.1-5.8 gigahertz band.

15. The method of claim 10, wherein the frequency band comprises the 2.4 or 5.1 gigahertz band.

16. The method of claim 10, wherein the antennas comprise at least one directional antenna.

17. The method of claim 10, further comprising providing data for displaying locations of the drones on a traffic collision avoidance display.

18. A runway system, comprising:
    a plurality of antennas directionally disposed along an approach or departure path; and a detector configured to provide a warning of a presence of an unmanned aerial vehicle or drone in response to a radio frequency signal received by at least one of the antennas being in a frequency band associated with a transmission frequency for the unmanned aerial vehicle or drone or in a frequency band associated with interaction from receive circuitry of the unmanned aerial vehicle or drone.

19. The runway system of claim 18, wherein the detector transmits a radio frequency signal for interacting with the receive circuitry of the unmanned aerial vehicle or drone.

20. The runway system of claim 18, wherein at least one of the antennas is a directional antenna.

\* \* \* \* \*